United States Patent
Hiremath et al.

(10) Patent No.: US 10,349,424 B2
(45) Date of Patent: Jul. 9, 2019

(54) EFFICIENT DUAL-MODE OPERATION OF A WIRELESS DEVICE AS AN ACCESS POINT AND A WIRELESS STATION OF RESPECTIVE WLAN NETWORKS

(71) Applicant: GainSpan Corporation, San Jose, CA (US)

(72) Inventors: Indudharswamy G Hiremath, Bangalore (IN); Shyju Narangaprath, Bangalore (IN)

(73) Assignee: GainSpan Corporation, San Jose, CA (US)

( * ) Notice: Subject to any disclaimer, the term of this patent is extended or adjusted under 35 U.S.C. 154(b) by 503 days.

(21) Appl. No.: 15/012,846

(22) Filed: Feb. 1, 2016

(65) Prior Publication Data
US 2017/0135120 A1   May 11, 2017

(30) Foreign Application Priority Data
Nov. 5, 2015   (IN) .............. 5986/CHE/2015

(51) Int. Cl.
*H04W 72/12*   (2009.01)
*H04W 12/06*   (2009.01)
(Continued)

(52) U.S. Cl.
CPC ........... *H04W 72/12* (2013.01); *H04W 12/04* (2013.01); *H04W 12/06* (2013.01); *H04W 84/12* (2013.01); *H04W 88/06* (2013.01)

(58) Field of Classification Search
CPC ..... H04W 72/12; H04W 12/04; H04W 12/06; H04W 880/06
See application file for complete search history.

(56) References Cited

U.S. PATENT DOCUMENTS

2006/0239223 A1   10/2006   Sherman et al.
2007/0249305 A1*  10/2007   Hsu .............. H04W 52/0287
                                                     455/127.5
(Continued)

OTHER PUBLICATIONS

Single-Chip IEEE 802.11a/b/g/n 2T2R WLAN Controller with USB 2.0 Interface, http://www.realtek.com.tw/products/productsView.aspx?Langid=1&PFid=53&Level=5&Conn=4&ProdID=310, downloaded circa Nov. 5, 2015, pp. 1-4.
(Continued)

*Primary Examiner* — Ian N Moore
*Assistant Examiner* — Latresa A McCallum
(74) *Attorney, Agent, or Firm* — Pearl Cohen Zedek Latzer Baratz LLP

(57) ABSTRACT

A wireless device operates as a wireless station (STA) associated with a first access point (AP) of one basic service set (BSS) in a first set of intervals, and as a second AP of another BSS in a second set of intervals. The wireless device, operating as a STA receives, in a first interval of the first set of intervals, indication that data is buffered in the first AP for the STA. The wireless device, operating as a STA issues, in a second interval of the first set of intervals, a request to the first AP for at least some portion of the buffered data. The second interval is later than the first interval and separated from the first interval by a third interval, the wireless device operating as the second AP in the third interval. Due to such operation, efficiencies such as reduced data loss can be obtained.

17 Claims, 11 Drawing Sheets

(51) Int. Cl.
*H04W 12/04* (2009.01)
*H04W 88/06* (2009.01)
*H04W 84/12* (2009.01)

(56) References Cited

U.S. PATENT DOCUMENTS

| | | |
|---|---|---|
| 2007/0281617 A1 | 12/2007 | Meylan et al. |
| 2010/0220597 A1 | 9/2010 | Ji et al. |
| 2013/0235773 A1* | 9/2013 | Wang ............... H04W 52/0206 370/311 |
| 2013/0315141 A1 | 11/2013 | Homchaudhuri et al. |
| 2014/0010219 A1 | 1/2014 | Dor et al. |
| 2014/0064068 A1* | 3/2014 | Horn ............... H04W 28/0289 370/230 |
| 2014/0211674 A1 | 7/2014 | Hiremath |
| 2014/0254565 A1 | 9/2014 | Pitchaiah et al. |
| 2014/0269463 A1 | 9/2014 | Miryala et al. |
| 2015/0163043 A1* | 6/2015 | Lee ............... H04L 5/0073 370/336 |
| 2016/0183162 A1* | 6/2016 | Jeong ............... H04W 40/22 370/311 |
| 2016/0337122 A1* | 11/2016 | Kwak ............... H04W 12/04 |
| 2017/0295541 A1* | 10/2017 | Kim ............... H04W 52/0216 |

OTHER PUBLICATIONS 802.11 Mgmt : Authentication Frame, https://mrncciew.com/2014/10/10/802-11-mgmt-authentication-frame/, downloaded circa Dec. 31, 2015, pp. 1-7.

Power Save Multi-Poll (PSMP), https://www.cwnp.com/power-save-multi-poll-psmp/, downloaded circa Dec. 31, 2015, pp. 1-9.

Understanding WPA-PSK and WPA2-PSK Authentication, http://www.juniper.net/techpubs/en_US/network-director1.1/topics/concept/wireless-wpa-psk-authentication.html, downloaded circa Dec. 31, 2015, pp. 1-2.

WMM and U-APSD Power save mode, http://ilovewifi.blogspot.in/2012/08/wmm-and-u-apsd-power-save-mode.html, downloaded circa Dec. 31, 2015, pp. 1-11.

WiFi Insider—WMM QoS, http://wifi-insider.com/wlan/wmm.htm, downloaded circa Dec. 31, 2015, pp. 1-2.

* cited by examiner

EFFICIENT DUAL-MODE OPERATION OF A WIRELESS DEVICE AS AN ACCESS POINT AND A WIRELESS STATION OF RESPECTIVE WLAN NETWORKS

PRIORITY CLAIM

The instant patent application claims priority from co-pending India provisional patent application entitled, "Efficient Time Division Multiplexed Concurrent operation of WLAN Station and WLAN AP", Application Number: 5986/CHE/2015, Filed: 5 Nov. 2015, naming Indudharswamy G Hiremath and Shyju Narangaprath as the inventors, and is incorporated it its entirety herewith, to the extent not inconsistent with the content of the instant application.

BACKGROUND OF THE INVENTION

Technical Field

Embodiments of the present disclosure relate generally to wireless networks, and more specifically to minimizing data loss when a wireless device operates in dual-mode as an access point and a wireless station.

Related Art

A wireless device refers to a device which communicates with other devices/systems over a wireless medium as a part of a WLAN (Wireless Local Area Network). As is well known, WLANs are typically implemented with wireless devices having transmission range of the order of a few tens of meters and are implemented to operate according to various standards. A common example of a communication standard is defined by IEEE 802.11 specifications.

An access point (AP) refers to a switching device of a WLAN, which receives packets from a wireless station and forwards the packet to, or towards, a target device. A wireless station (STA) on the other hand is the source or destination/target in the wireless network (e.g., WLAN as noted above) of such packets. The target device is often another STA in the same wireless network, though it can be a device connected through the Internet via the AP.

In a typical implementation, the AP and the STA are separate devices in the wireless network. However, the AP and the STA may also be implemented in a single device, referred to as a dual-mode device. The dual-mode device supports the execution of the AP and the STA as two different modes in respective WLANs, within the single wireless device.

Such dual-mode of operation may be based on time division multiplexing (TDM), with the AP and STA being operated to transmit in, and receive from, either a same channel or separate channels, in alternate non-overlapping intervals (with each interval being marked by a start and end boundaries), as is well known in the relevant arts. Typically, the STA of a dual-mode device operates as part of one basic service set (BSS/WLAN), while the AP of the dual-mode device operates as part of another BSS in corresponding time durations.

In general, such wireless devices operating in dual-mode need to be implemented to meet various requirements such as desired throughput performance, reduced data loss, etc. Aspects of the present disclosure address one or more of such requirements.

BRIEF DESCRIPTION OF THE VIEWS OF DRAWINGS

Example embodiments of the present invention will be described with reference to the accompanying drawings briefly described below.

The drawing in which an element first appears is indicated by the leftmost digit(s) in the corresponding reference number.

DETAILED DESCRIPTION

1. Overview

Figure 1:
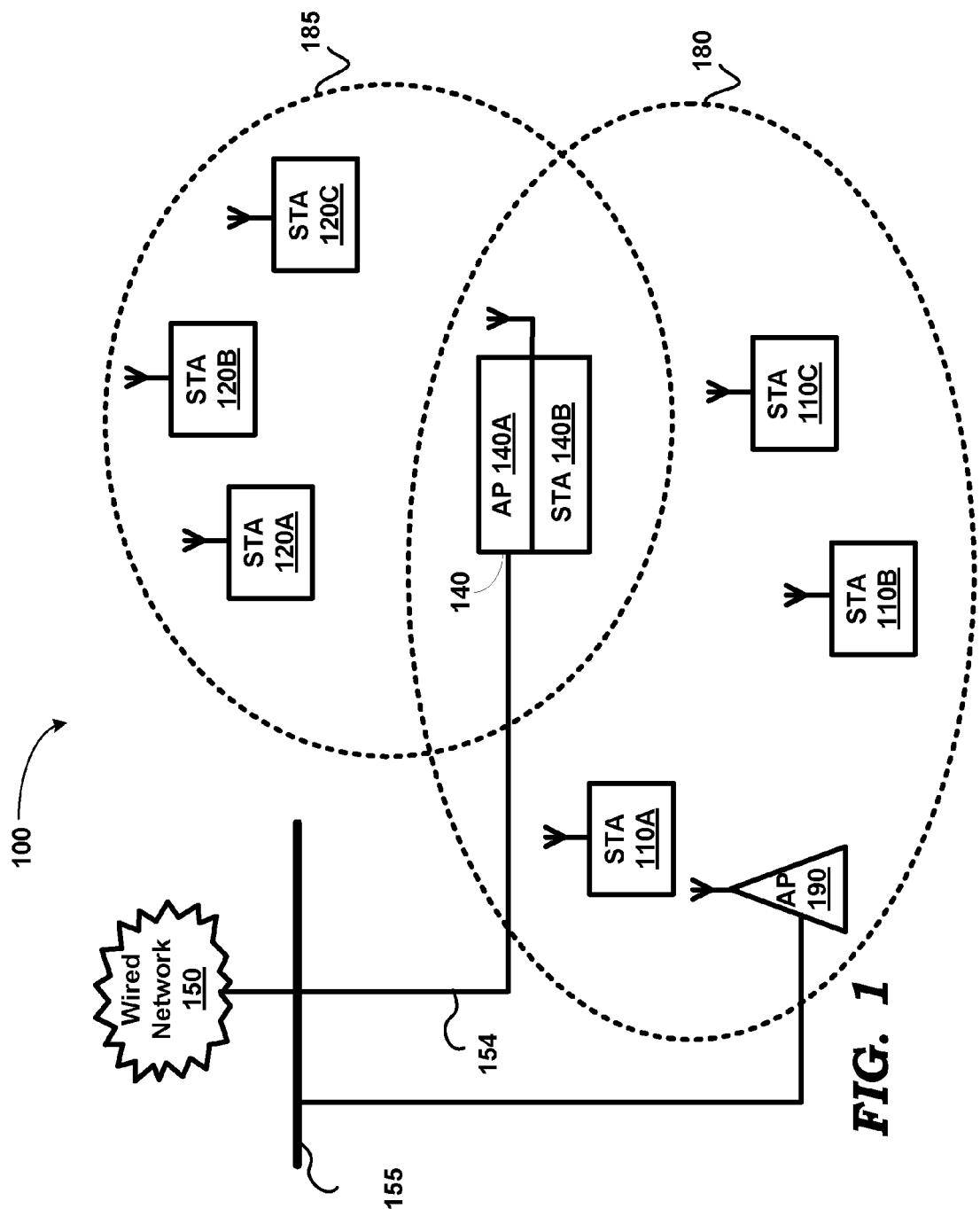
FIG. 1 is a block diagram of an example environment in which several features of the present invention can be implemented.

According to an aspect of the present disclosure, a wireless device operates as a wireless station (STA) associated with a first access point (AP) of a first basic service set (BSS) in a first set of intervals, and as a second AP of a second (BSS) in a second set of intervals. The wireless device operating as a STA receives, in a first interval of the first set of intervals, an indication that data is buffered in the first AP for the STA. The wireless device operating as a STA issues, in a second interval of the first set of intervals, a request to the first AP for at least some portion of the buffered data. The second interval is later than the first interval and separated from the first interval by a third interval, with the wireless device operating as the second AP in the third interval. Due to such operation, efficiencies such as reduced data loss can be obtained.

According to another aspect, the wireless device sends the request in the second interval only if the indication is received later than a pre-determined duration from the start of the first interval. Otherwise, the request (for buffered data) is sent in the first interval itself to obtain a higher effective data throughput (as in normal or prior approaches). In an embodiment the indication is a bit in a Traffic Indication MAP (TIM) in a beacon transmitted by the first AP.

According to another aspect of the present disclosure, a TIM bit is received earlier than the pre-determined duration within a THIRD interval (of the first set of intervals), and a data frame is received in the THIRD interval thereafter. The data frame is received after the pre-determined interval and contains a more data bit indicating that additional data is present in the first AP for the STA. The STA sends a request for the additional data in a next interval (of the first of intervals) to receive the additional data in the next interval.

In an embodiment, the pre-determined duration is more than a second duration from the end of the first interval, wherein said second duration equals a duration normally required for requesting a data frame from said first AP and to receive said data frame. In other words, even if there is sufficient time under optimal conditions to receive the data frame, the request is deferred to the next interval with a cautious view to avoiding data loss.

According to one more aspect of the present disclosure, the request for data is sent before receipt of a beacon expected in the same interval (of the first set of intervals). Such an operation maximizes the duration for receipt of the data frames from the first AP.

According to yet another aspect of the present disclosure, the STA receives a TIM bit indicating that there is no data buffered for the STA. In response, the wireless device switches over to operating as the second AP, ahead of a boundary in normal course based on expected arrival times of beacons from said first AP and desired transmission times of beacons from said second AP in a normal mode of operation.

According to another aspect of the present disclosure, the STA exchanges authentication and association frames in a sixth interval and transmits a message indicating that the STA is transitioning to a power-save state. In response, the first AP desists from commencing procedures for generation of security keys for use in data-exchange between the STA and the first AP till the STA transmits another message to the first AP to commence the procedures. The STA sends such another message in a immediately following operating interval.

Several aspects of the invention are described below with reference to examples for illustration. It should be understood that numerous specific details, relationships, and methods are set forth to provide a full understanding of the invention. One skilled in the relevant arts, however, will readily recognize that the invention can be practiced without one or more of the specific details, or with other methods, etc. In other instances, well-known structures or operations are not shown in detail to avoid obscuring the features of the invention.

2. Example Environment

FIG. 1 is a block diagram representing an example environment in which several aspects of the present disclosure can be implemented. The example environment is shown containing only representative systems for illustration. However, real-world environments may contain many more systems/components as will be apparent to one skilled in the relevant arts. System 100 of FIG. 1 is shown containing wireless device 140, WLAN wireless stations (STA) 110A-110C and 120A-120C, access point (AP) 190, wired network backbone 155 and wired network 150.

Wireless device 140 represents a dual-mode device that is designed to operate as an AP in one WLAN network, and as a STA in another WLAN network. In the environment of FIG. 1, wireless device 140 is assumed to operate as an AP in WLAN network 185, and as a STA in WLAN network 180. When operating as an AP, wireless device 140 is also referred to herein as AP 140A. Similarly, when operating as a STA, wireless device 140 is also referred to herein as STA 140B.

In an embodiment, each of WLAN networks 180 and 185 represents a basic service set (BSS) consistent with the IEEE 802.11 standard(s), and thus is also referred to herein as BSS 180 and BSS 185, respectively. However, other embodiments may include more than one BSS, with the BSSs being interconnected to form an extended service set (ESS) consistent with the IEEE 802.11 standards, as is well known in the relevant arts. BSS 180 contains STAs 120A-120C and AP 140A. BSS 185 contains STAs 110A-110C and AP 140B and AP 190. The devices of BSS 180 and BSS 185 may all operate in a same wireless channel (as specified by the IEEE 802.11 standards). Alternatively, the devices of BSS 180 may operate in one wireless channel, while the devices of BSS 185 may operate in another wireless channel.

AP 140A is (optionally) connected by a wired medium (154) to wired network backbone 155, and thus to wired network 150. Wired network 150 may represent the World Wide Web or internet. Each of STAs 120A-120C is designed to operate consistent with the IEEE 802.11 standard, and may communicate with each other wirelessly through AP 140A according to any of the family of IEEE 802.11 protocols (including as specified in IEEE 802.11a, 802.11b, 802.11i, 802.11g and 802.11n), and also with devices/systems in wired network 150 via AP 140A.

AP 190 is (optionally) connected by a wired medium to wired network backbone 155, and thus to wired network 150. Each of STAs 110A-110C and STA 140B is designed to operate consistent with the IEEE 802.11 standard, and may communicate with each other wirelessly through AP 190 according to any of the family of IEEE 802.11 protocols (including as specified in IEEE 802.11a, 802.11b, 802.11i, 802.11g and 802.11n), and also with devices/systems in wired network 150 via AP 190. STAs 120A-120C, 110A-110C and 140B may correspond, for example, to a laptop computer, smart phone, or a wireless sensor.

As noted above, the dual-mode operation of wireless device 140 as AP 140A and STA 140B may be based on time division multiplexing (TDM). Thus, AP 140A and STA 140B may operate to transmit in, and receive from, the corresponding wireless channel in respective, non-overlapping intervals which may alternate. Such dual-mode operation of wireless device 140 may be required to support several requirements such as minimum data loss in either mode, increased throughput in each of the two modes, etc. Several aspects of the present disclosure are directed to efficient operation of wireless device 140 in dual-mode as AP and STA, as illustrated next with examples.

3. Wireless Device Operation

Figure 2:
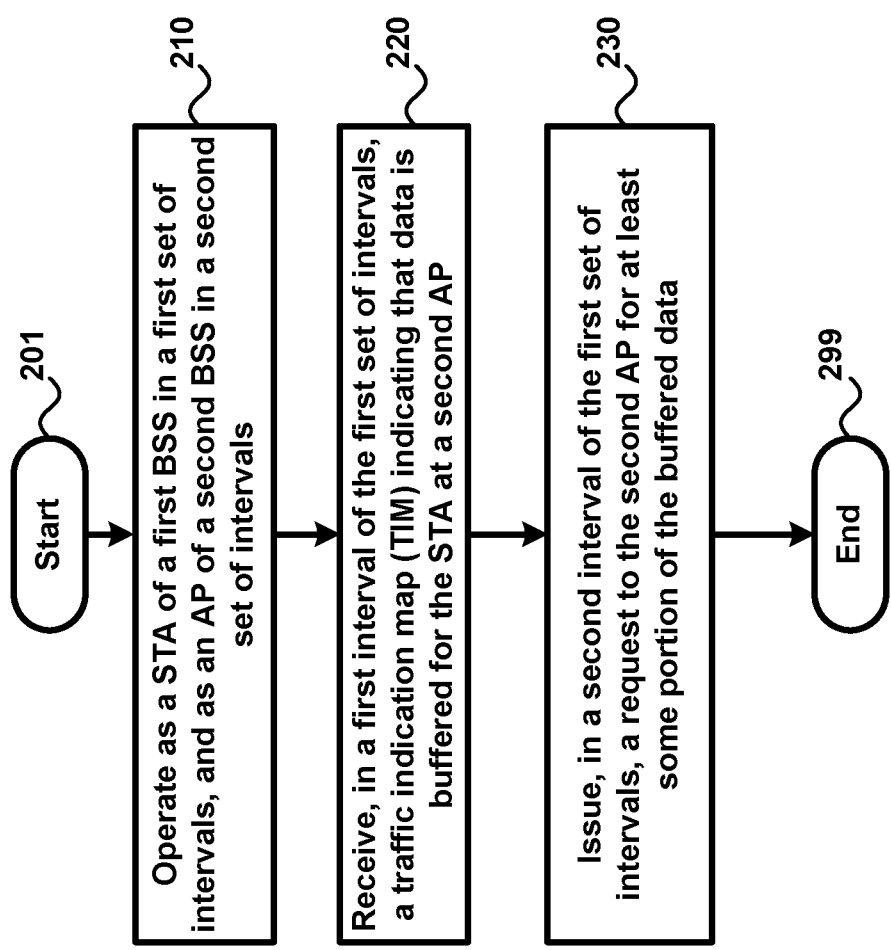
FIG. 2 is a flowchart illustrating the operation of a wireless device, in an embodiment of the present disclosure.

FIG. 2 is a flowchart illustrating the operation of wireless device 140, in an embodiment. The flowchart is described with respect to the environment of FIG. 1, and in relation to wireless device 140, merely for illustration. However, various features described herein can be implemented in other environments and using other components as well, as will be apparent to one skilled in the relevant arts by reading the disclosure provided herein. Further, the steps in the flowchart are described in a specific sequence merely for illustration. Alternative embodiments using a different sequence of steps can also be implemented without departing from the scope and spirit of several aspects of the present invention, as will be apparent to one skilled in the relevant arts by reading the disclosure provided herein. The flowchart starts in step 201, in which control passes immediately to step 210.

In step 210, wireless device 140 operates as STA 140B associated with AP 190 of BSS 180 in a first set of intervals, and as AP 140A of BSS 185 in a second set of intervals. In an embodiment, intervals of the first set of intervals alternate with corresponding intervals of the second set of intervals, such that wireless device 140 alternately operates as STA 140B and AP 140A in a time division multiplexed (TDM) manner Control then passes to step 220.

In step 220, wireless device 140 operating as STA 140B receives, in a first interval of the first set of intervals, an indication indicating that data is buffered in AP 190 for STA 140B. The data may have been received by AP 190 for STA 140B, from any of the other STAs in BSS 180 or from wired path 155. Control then passes to step 230.

In step 230, wireless device 140 operating as STA 140B issues, in a second interval of the first set of intervals, a request to AP 190 for at least some portion of the buffered data. Due to the dual mode of operation, there is at least one interval of the second set of intervals between the first and second intervals (of the first set). Control then passes to step 299, in which the flowchart ends.

Due to the operation in accordance with the flow chart, benefits such as avoidance of loss of data and/or better data throughput performance may be obtained as illustrated next with example timing diagrams.

4. Deferring Request for Buffered Data

Figure 3A:
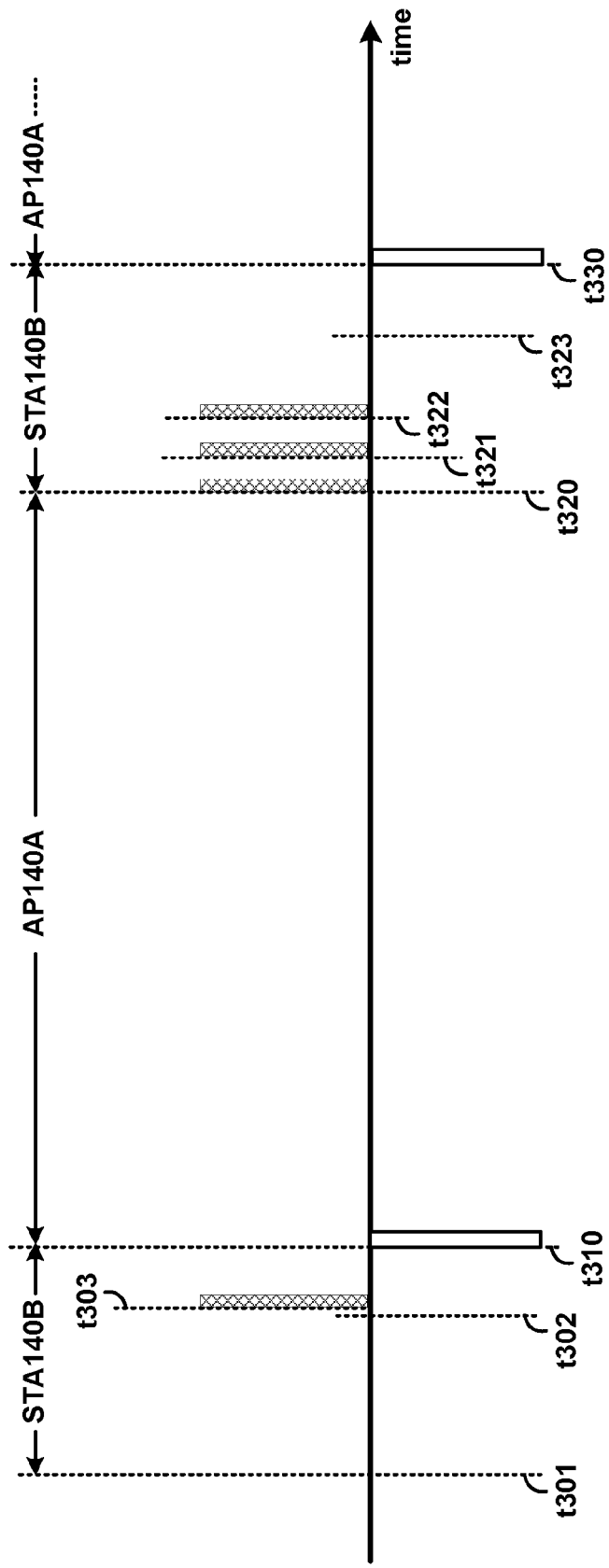
FIG. 3A is a timing diagram illustrating one example of when a wireless station of a dual-mode wireless device defers request for buffered data, in an embodiment of the present disclosure.

FIG. 3A is a timing diagram illustrating the manner in which wireless device 140 operates, in an embodiment of the present disclosure. Merely for illustration, it is assumed in the description below with respect to the timing diagram of FIG. 3A (as well as those of FIGS. 3B, 4, 5 and 6) that each 100 millisecond (ms) duration (constituting one cycle) of operation of wireless device 140 is divided into 20 ms and 80 ms intervals. However, alternative embodiments can be implemented with other durations, without departing from the scope and spirit of various aspects of the present disclosure, as will be apparent to one skilled in the relevant arts by reading the disclosure provided herein.

Wireless device 140 operates as STA 140B in each of the first 20 ms (first set of intervals) of each 100 ms duration, and as an AP 140A in each of the last 80 ms (second set of intervals) of each 100 ms duration. The start of each 20 ms interval is synchronized just ahead of the expected transmission of beacon by AP 190. AP 140A transmits beacons at the start of each 80 ms interval. It is to be understood that the specific durations and time-alignments of operation as STA 140B and AP 140A noted above are merely by way of example only. Other values and time alignments for the intervals may be used in other embodiments. It is also assumed that STA 140B operates as a power-save-capable STA, i.e., in power-save mode(s) according to IEEE 802.11. It is noted here that a beacon interval in IEEE 802.11 is exactly equal to 102.4 ms (rather than 100 ms). Therefore, in practice the intervals of 20 ms and 80 ms would accordingly be different such that back-to-back operating intervals of STA 140B and AP 140A would add to 102.4 ms (rather than 100 ms, which has been assumed herein in the interest of ease of description).

In each of FIGS. 3A, 3B, 4, 5, 6 and 7, transmission/reception of a frame during operation as STA 140B are indicated by hashed vertical bars shown above the horizontal 'time' line. The left and right verticals sides of each hashed bar respectively indicate the start (also indicated by a time marker) and end (not indicated by time markers) of transmission/reception of that frame. Transmission/reception of a frame during operation as AP 140A are indicated by un-hashed vertical bars shown below the horizontal 'time' line. The left and right verticals sides of each un-hashed bar respectively indicate the start (also indicated by a time marker, e.g., t310 and t330) and end (not indicated by time markers) of transmission/reception of that frame.

Referring to FIG. 3A, two 20 ms intervals of operation of wireless device 140 as STA 140B are shown, namely intervals t301-t310 and t320-t330. AP 140A is shown operating in interval t310-320 (80 ms) and for another 80 ms interval starting at t330. The operations as STA 140B and AP 140A alternate every 100 ms. Optionally, although not noted below, at the end of each of its operating interval, STA 140B may issue a NULL frame with the power-management bit set to one to indicate to AP 190 that STA 140B is entering a power-down state. As a result AP 190 desists from transmitting any buffered frame destined for STA 140B until the STA issues another NULL frame with power-management bit set to zero at the start of a next operating interval of STA 140B (also not shown in the Figures). Depending on the specific implementation of wireless device 140, upon entering a power-down state, at least some hardware portions (other than the MAC, baseband and RF portions, or in general portions that are shared with AP 140A) may be powered down. Such hardware portions are then powered-up on STA 140B entering an "active state", immediately after which a NULL frame with power-management bit set to zero may be transmitted, as noted above.

STA 140B expects to receive a beacon from AP 190 at t301. As is well known, beacons are transmitted by an AP (such as AP 190) every 100 ms. However, transmission of beacons may be delayed with respect to the expected time due to reasons such crowded channel or interference, the AP not getting access to the channel in time to send beacon, software bugs in the AP, loss of synchronization of start of operation as STA 140B with start of beacon transmission from AP, etc. In FIG. 3A, the beacon from AP 190 is shown as being received starting at time instant t303, a duration t301-t303 later than the expected transmission time. The TIM (Traffic Indication MAP) bit corresponding to STA 140B in the beacon received at t303 is assumed to indicate that AP 190 has buffered data destined for STA 140B. However, since the TIM is received later than time instant t302 (which is a pre-determined duration later than t301), STA 140B does not issue a request for the buffered data in the current operating interval (t301-t310). Instead, STA 140B defers the request for the buffered data till its next operating interval t320-t330.

At t320, STA 140 receives another beacon from AP 190. The beacon at t320 also contains a TIM bit indicating that data is buffered in AP 190 for STA 140B. It is noted that although the term "data" is used above to indicate what is buffered, in general, such 'data' may represent application data (i.e., data directed to applications executing on wireless device 140) and/or bufferable management frames. Bufferable management frames may, for example, be Action frames, Disassociation frames, or De-authentication frames according to IEEE 802.11. Therefore, the terms "buffered data" and "data frames" as used herein, represent application data and/or bufferable management frames.

While a beacon is shown as being transmitted (and received) at t320, such beacon may also be delayed with respect to start of interval t320) just as with beacon at t303. In either scenario, STA 140B issues a request (e.g., in the form of a power-save poll frame according to IEEE 802.11) for the buffered data (indicated by the TIM received at t303 itself) at t321. Time instant t321 occurs earlier than expiry of the pre-determined duration (noted above) from t320. In response to the request issued at t321, AP 190 transmits the buffered data at t322.

The buffered data may be transmitted by AP 190 at t322 in the form of one or more frames, as determined by the protocol. In each frame transmitted by AP 190, AP 190 indicates in a "more data" field (or bit) of the transmitted frame whether more frames remain to be transmitted or not. STA 140B examines the "more data" field, and if the "more data" field indicates that more frames remain to be transmitted to STA 140B, STA 140B issues a request (e.g., in the form of a PS-poll frame) for the next frame. STA 140B continues making such requests for the next frame (if any) till t323, but not later than t323 in interval t320-t330. The interval t320-t323 represents the pre-determined duration in interval operating t320-t330. On the other hand, if 'more data' bit indicates there is no more data currently buffered for STA 140B, then STA 140B does not issue any more requests for buffered data.

If by time instant t323, all data have not been received by STA 140B (i.e., if a data frame with a "more data" bit set to logic one is received later than t323), STA 140B defers a next request for data till commencement of a next operating interval of STA 140B.

AP 140A transmits respective beacons at t310 and t330, and may exchange data/command frames with associated stations (120A-120C) in its operating intervals, although such transmissions/receptions are not shown in FIG. 3A in the interest of clarity. Similarly, although not shown in FIG. 3A, other frames may be transmitted/received by STA 140B in its operating intervals. However, STA 140 does not issue a request for buffered data later than the pre-determined duration in an operating interval, as noted above.

By not transmitting a request for data buffered for it (in AP 190) later than expiry of a pre-determined duration in its operating interval, STA 140B potentially prevents transmission of data frames destined for STA 140B from occurring in the intervals when wireless device operates as AP 140A (e.g., interval t310-t320 in FIG. 3A). As a result, loss of reception of such data that would otherwise have been transmitted by AP 190 is prevented. In an embodiment, the pre-determined duration (t301-t302 and t320-t323) is 17 ms from the start of an operating interval of STA 140B. In another embodiment, the pre-determined duration is at most 75% of the operating interval, as measured from the start of the operating interval of STA 140B.

It is noted here that the duration of a frame in IEEE 802.11 (and thus a data frame or bufferable management frame transmitted by AP 190) may be less than 1 millisecond (ms), based on transmission rate and under optimal conditions. Thus, the interval from the end of the pre-determined duration in an operating interval of STA 140B to the end of the operating interval of STA 140B may be sufficient for STA 140B to send a request to AP 190 for buffered data, and to receive at least one frame of buffered data from AP 190. However, STA 140B does not request for the buffered data if the indication of availability of buffered data is received later than the pre-determined duration in the operating interval. Instead, STA 140B defers such request to the next interval with a cautious view to avoiding data loss (since, for example, an unpredictable duration of time may be consumed in AP 190 contending for, and obtaining, access to the wireless medium, etc.).

Figure 3B:
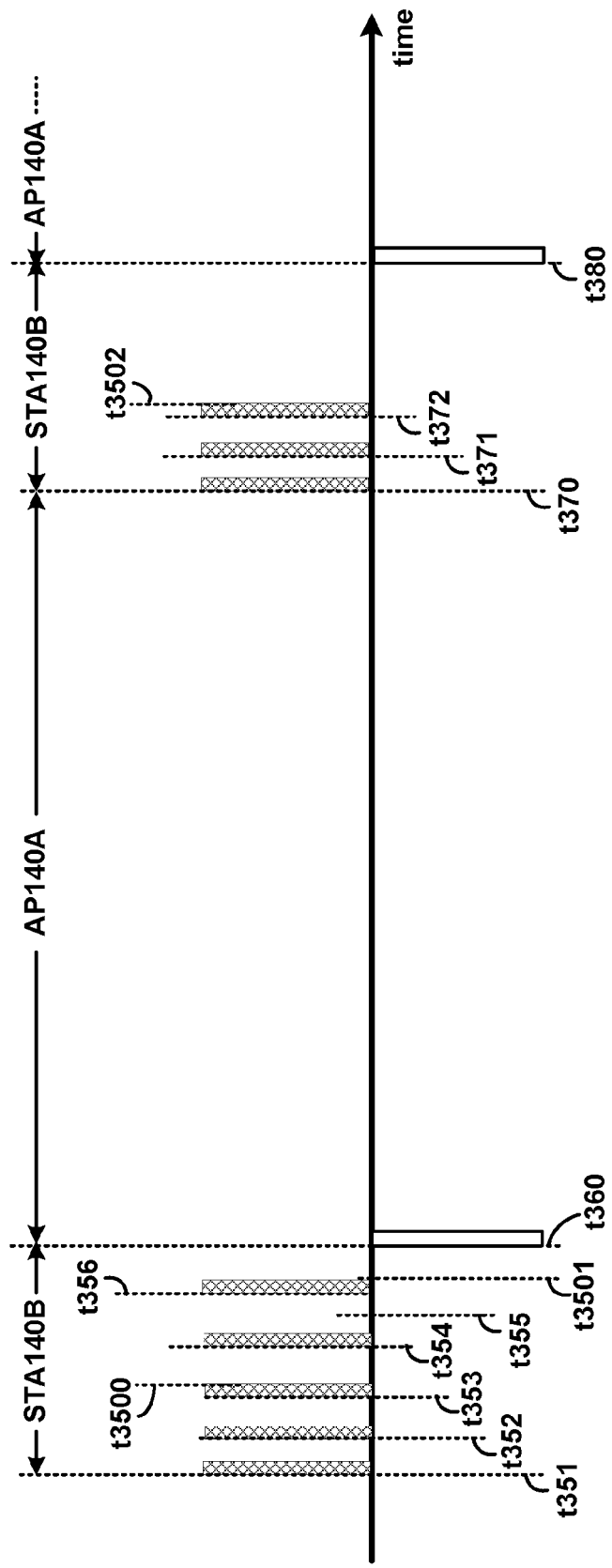
FIG. 3B is a timing diagram illustrating another example of when a wireless station of a dual-mode wireless device defers request for buffered data, in an embodiment of the present disclosure.

Another scenario in which STA 140B defers, to a next operating interval, issuance of a request for data buffered for it in AP 190, is upon indication in the form of a "more data" bit in a data frame transmitted by AP 190 that AP 190 has buffered data for STA 140B, and is illustrated with respect to FIG. 3B. AP 190 transmits a beacon at t351 (start of an operating interval of STA 140B), with the beacon containing a TIM bit indicating that data is buffered for STA 140B in AP 190. Since the TIM is received earlier than t355, i.e., prior to the end of the predetermined interval (e.g., 17 ms) from t351, STA 140B issues a request (e.g., PS-poll frame) for the data at t352. In response, AP 190 transmits a data frame at t353 containing data, with the frame also containing a "more data" bit, indicating that there is more data buffered in AP 190 for STA 140B.

STA 140B receives the data frame, checks the "more data" bit in the data frame, and issues another request at t354. In response, AP 190 transmits another data frame at t356 containing data, with the frame also containing a "more data" bit, indicating that there is yet more data buffered in AP 190 for STA 140B. STA 140B receives the frame, checks the "more data" bit in the frame, and determines that there is more data for its buffered in AP 190. However, since the indication of 'more data' is received later than the pre-determined duration (t351-t355) from start of STA 140B's operating interval at t351, STA 140B does not issue a request for the remaining data in interval t351-t360. As a result, potential transmission of data meant for STA 140B by AP 190 in an operating interval (t360-t370) of AP 140A is prevented.

At t370 (start of next operating interval of STA 140B), STA 140 receives a beacon. The TIM bit corresponding to STA 140B in the beacon indicates that AP 190 has data destined for STA 140B, although STA 140B already 'knows' that AP 190 has more data for STA 140B. At t371, STA 140B issues a request for the data buffered in AP 190. AP 190 transmits the data in a data frame at t372, with the "more data" bit in the data frame indicating that there is no more data buffered in AP 190 for STA 140B. It is noted here that if beacon at t320 were delayed, then STA 140B sends the request for the buffered data without waiting for the beacon (based on the "more data" bit in frame received at t356).

When a beacon with an active TIM bit for STA 140, or data frame with the "more data" bit set straddles the end of the pre-determined interval (such that start of such frame is earlier than end of the pre-determined interval, but receipt of the TIM/"more data" bit is later than the pre-determined interval), then the time instant at which STA 140B determines that data is buffered for it in AP 190 is used to determine whether STA 140B issues a request for the data or not. If the time instant of such determination occurs later than the end of the pre-determined interval, STA 140B defers the request till a next operating interval, as described above.

AP 140A transmits respective beacons at t360 and t380, and may exchange data/command frames with associated stations (120A-120C) in its operating intervals, although such transmissions/receptions are not shown in FIG. 3B in the interest of clarity.

The description provided thus far with respect to FIG. 3A and FIG. 3B assumes that STA 140B and AP 190 operate in legacy 802.11 mode, according to which a wireless device (AP 190, STA 140B, AP 140A) has to contend for the wireless medium prior to transmitting every frame. However, STA 140B and AP 190 may also operate in U-APSD mode (Unscheduled-Automatic Power Save Delivery, defined in IEEE 802.11e, and also termed Wireless Multimedia Extensions or WMM Power Save (WMM-PS)).

As is well known in the relevant arts, WMM-PS improves power savings in wireless stations by decreasing, when compared to legacy power-save mode operation, the number of frames that a STA needs to send and receive to download the same number of frames buffered by the AP. According to WMM-PS, channel access is acquired by a wireless device for an uninterrupted duration termed an Enhanced Distributed Channel Access Transmit Opportunity (EDCA TXOP or simply TXOP). A device may transmit multiple frames (without contending for the medium for each frame in the multiple frames, except the first frame) within a TXOP, with each frame interleaved by an acknowledgement (ACK) from the receiving device. The specific power-save mode is negotiated by STA 140B during association with AP 190. The manner in which STA 140B, operating according to WMM-PS, defers request for buffered data under the same scenarios described above with respect to FIG. 3A and FIG. 3B are described below with respect to FIG. 4A and FIG. 4B respectively.

Figure 4A:
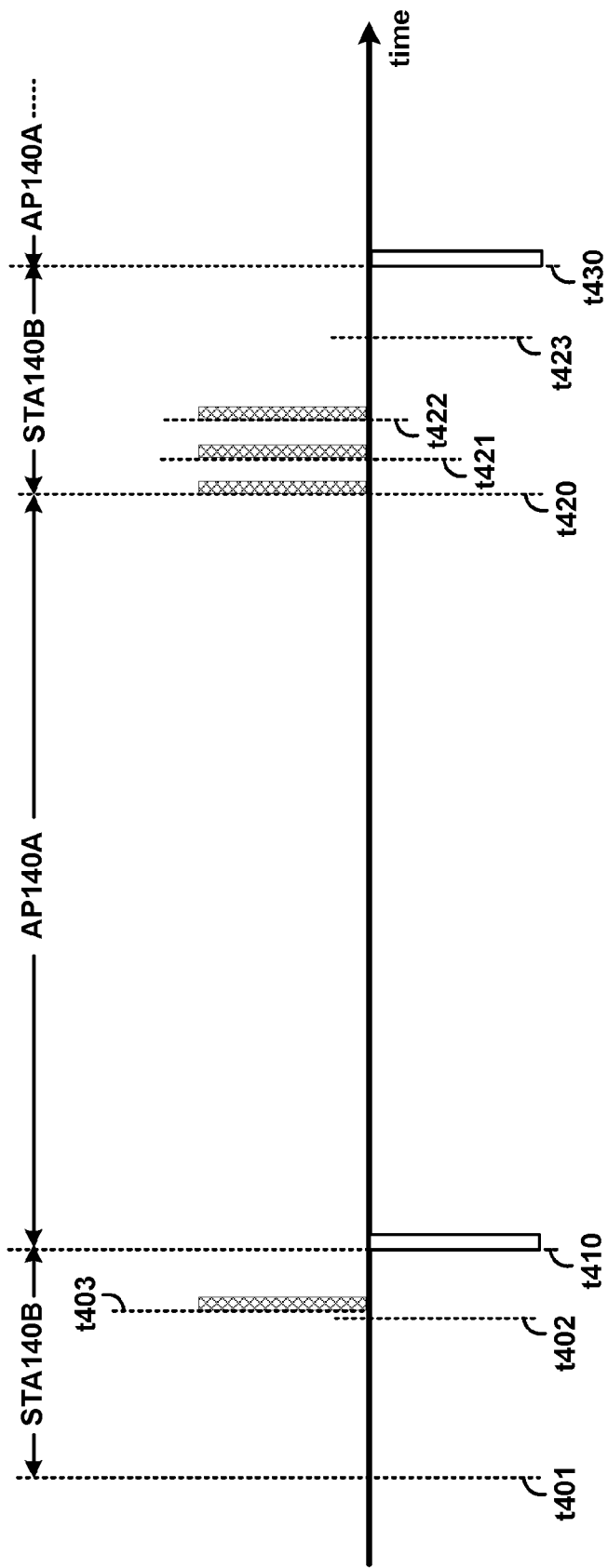
FIG. 4A is a timing diagram illustrating one example of when a wireless station of a dual-mode wireless device defers request for buffered data, in another embodiment of the present disclosure.

Referring to FIG. 4A, STA 140 receives a beacon with TIM bit corresponding to STA 140B set to indicate that data is buffered in AP 190 for STA 140B. Since the TIM is received at t403 (which is later than t402—the end of the pre-determined duration from t401), STA 140B defers the request for the buffered data till the next operating interval. AP 190 transmits a beacon at t420. The request for data by STA 140B at t421 can be a QoS data or NULL frame (or, in general, a trigger frame). In response, AP 190 obtains a TXOP, and transmits the buffered data starting at t422. It is assumed that all the buffered data (one or more frames) fit into one TXOP. Thus, the last data frame in the TXOP contains a 'more data' bit that indicates there is no more data currently buffered for STA 140B. AP 140A transmits beacons at t410 and t430.

Although not shown in FIG. 4A, in general, when multiple frames are buffered in AP 190 for STA 140B, AP 190 transmits buffered frames for the duration of the TXOP. AP190 sets "more data" bit in every frame as long as there are more frames buffered at AP after the current frame. The last data frame would contain a 'more data' bit that indicates there is no more data currently buffered for STA 140B in AP 190.

Figure 4B:
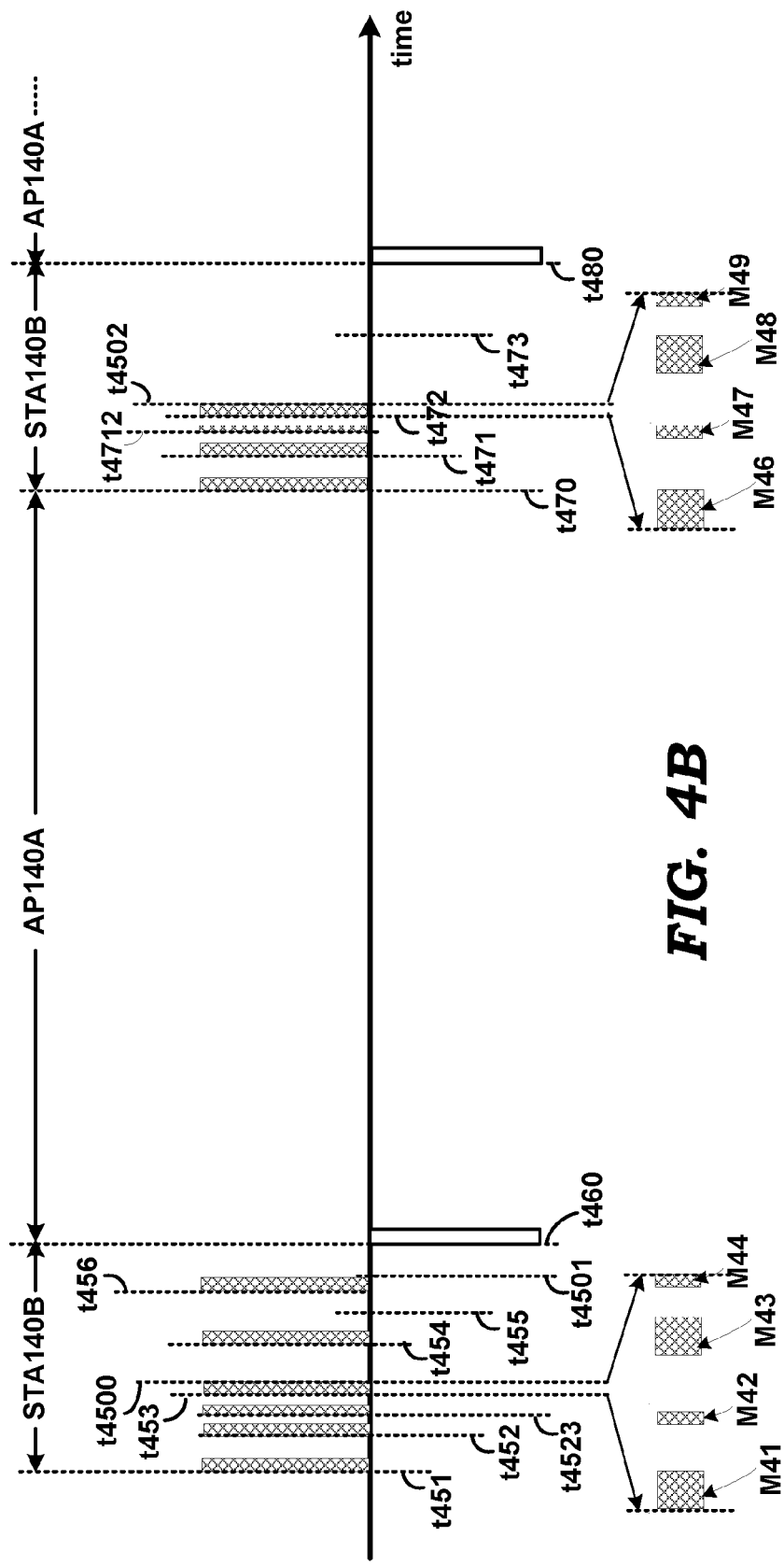
FIG. 4B is a timing diagram illustrating another example of when a wireless station of a dual-mode wireless device defers request for buffered data, in another embodiment of the present disclosure.

Referring to FIG. 4B, STA 140B receives, at t451, a beacon from AP 190 with a TIM bit in the beacon indicating that AP 190 has buffered data destined for STA 140B. It is assumed that the volume of buffered data is large enough that AP 190 would require multiple TXOPs to transmit all of the buffered data to STA 140B. In response to the active TIM bit in the beacon of t451, STA 140B issues, at t452, a request for the data in the form of a trigger frame. AP 190 acknowledges the trigger frame by transmitting an acknowledge frame at t4523, without contending for the wireless medium. AP 190 then contends for the wireless medium and obtains a TXOP starting at t453. The length of the TXOP is assumed to equal duration t453-t4500. The transmission and receptions of frames in TXOP t453-t4500 are shown on a bigger scale by markers M41 through M44.

In the TXOP t453-t4500, AP 190 first transmits a data frame (M41). In response to receipt of the data frame M41, STA 140B transmits an acknowledgement frame (M42). AP 190 then transmits a next data frame (M43). M43 is the last data frame in TXOP t453-t4500, and contains a 'more data' bit indicating that AP 190 has more data destined for STA 140B. STA 140B sends another acknowledgement frame (M44). All acknowledgements in TXOP t453-t4500 are transmitted after a SIFS (Short Interframe Space) duration (16 microseconds) following the frame they acknowledge without contending for channel (wireless medium).

In response to the 'more data' bit of data frame M43, STA 140B transmits another trigger frame at t454. In response to the trigger frame at t454, AP 190 transmits an acknowledgement frame (not shown) without contending for the wireless medium, and then contends for the medium and obtains TXOP t456-t4501. Although not specifically shown in FIG. 4B in the interest of clarity, in TXOP t456-t4501, AP 190 transmits multiple data frames. The multiple data frames are interleaved with ACK frames from STA 140B (similar to that in TXOP t453-t4500). In the last data frame in TXOP t456-t4501, AP 190 indicates that more data is buffered for STA 140B through a 'more data' bit. However, STA 140B defers issuance of a next trigger frame till t471, since the indication of more data is received after t455, interval t451-t455 equaling the pre-determined duration.

In the next operating interval of STA 140B, AP 190 transmits a beacon at t470. STA 140B then transmits a trigger frame at t471, in response to the last data frame of TXOP t456-t4501 indicating that more data is buffered in AP 190 for STA 140B. It is noted that in some scenarios the beacon of t470 may be delayed, and STA 140B issues the trigger frame of t471 irrespective of non-receipt of the beacon. AP 190 acknowledges the trigger frame of t471 by transmitting an acknowledge frame at t4712, without contending for the wireless medium.

AP 190 then contends for the wireless medium, and obtains a TXOP starting at t472. The length of the TXOP is assumed to equal duration t472-t4502. The transmission and receptions of frames in TXOP t472-t4502 are shown on a bigger scale by markers M46 through M49. In TXOP t472-t4502, AP 190 first a data frame (M46). In response to receipt of the data frame M46, STA 140B transmits an acknowledgement frame (M47). AP 190 then transmits a next data frame (M48). M48 is the last data frame in TXOP t472-t4502, and contains a 'more data' bit indicating that AP 190 does not have any more data destined for STA 140B. STA 140B sends another acknowledgement frame (M49). Interval t470-t473 equals the pre-determined duration in operating interval t470-t480. AP 140A transmits beacons t460 and t480 at the respective start instants of its operating intervals.

As in the scenarios of FIG. 3A and FIG. 3B, by not transmitting a request for data buffered for it later than expiry of the pre-determined duration in its operating interval, STA 140B potentially prevents transmission of data frames destined for STA 140 from occurring in the intervals when wireless device operates as AP 140A, and loss of reception of such data that would otherwise have been transmitted by AP 190 is prevented.

Other techniques to maximize efficiency of dual-mode operation of wireless device 140 are described next.

5. Issuing Request for Buffered Data Prior to Receipt of Beacon

Figure 5:
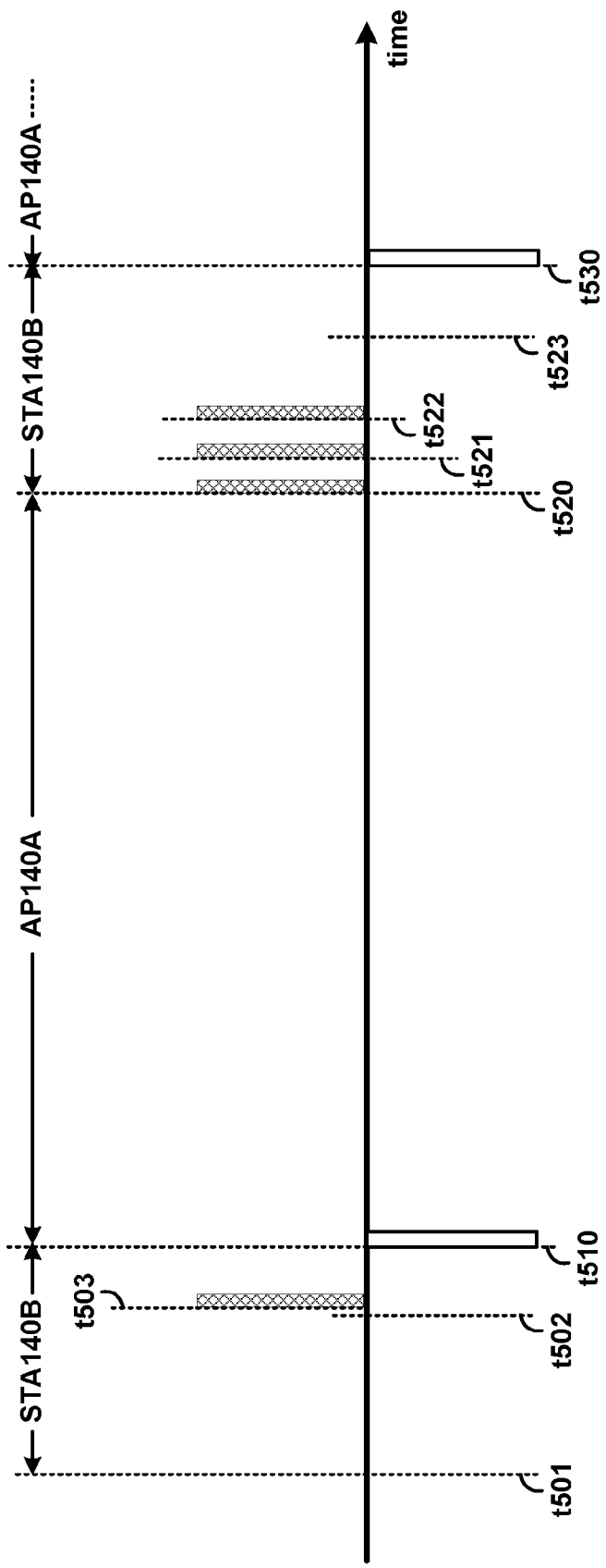
FIG. 5 is a timing diagram illustrating the manner in which a wireless station of a dual-mode wireless device requests for buffered data ahead of receipt of a beacon, in an embodiment of the present disclosure.

According to another technique for maximizing efficiency while operating in dual-mode, STA 140B issues a request for buffered data (indicated to be available in an operating interval) at the beginning of a next operating interval, prior to receipt of a beacon in the next operating interval, as illustrated with respect to FIG. 5.

Referring to FIG. 5, STA 140B receives a beacon at t503 from AP 190, with the TIM bit corresponding to STA 140B in the beacon indicating that data is buffered in AP 190 for STA 140B. Since the TIM bit is received later than the end of the pre-determined duration t501-t502 (which, for example, may be 17 ms as also noted above) of the operating interval t501-t510, STA 140B defers issuance of a request for the buffered data to the next operating interval t520-t530. However, rather than waiting for receipt of a beacon from AP 190 before issuing a request for the data, STA 140B issues the request at the start (t520) of the interval t520-t530. If the beacon expected at t520 is delayed, then the request from STA 140B is successful. However, assuming AP 190 also attempts to transmit a beacon at t530 (i.e., both AP 190 and STA 140B start contention for the wireless medium substantially simultaneously), then which of STA 140B and AP 190 gets access to the medium is probabilistic. However, in some other instances, AP 190 may get access to the medium and transmit the beacon first (with the TIM bit indicating availability of additional data again), and STA 140B would thereafter transmit the request for the buffered data. In FIG. 5, it is assumed that the beacon from AP 190 is delayed.

In response to receiving the request (in both cases of above), AP 190 transmits, at t521, the buffered frame. STA 140B receives the buffered frame and inspects the 'more data' bit in the frame, which is assumed to indicate that no more data is currently buffered for STA 140B in AP 190. However, if more data is currently buffered in AP 190, STA 140B operates as described above to receive the remaining data. In particular, STA 140B would not issue a next request for data till a next operating interval (not shown) if a "more data" indication is received later than t523 (which is assumed to indicate the end of the pre-determined duration) in operating interval t520-530. AP 190 transmits a beacon at t422. AP 140A transmits beacons at t410 and t430. In the example of FIG. 5, STA 140B may operate either in legacy power-save mode or WMM-PS mode. The benefit of the technique described with respect to FIG. 5 is that it increases the probability that AP 190 transmits buffered data (potentially all of the buffered data) for STA 140B in the same operating interval (t520-t530) itself.

The technique of issuing a request for buffered data prior to reception of a beacon may also be used by STA 140 in the scenario where indication of buffered data is received before end of the pre-determined duration of an operating interval, but where the volume of data is large so as to cause AP 190 to transmit multiple buffered frames, some of which can be transmitted only in a next operating interval, as described above with respect to FIG. 3B and FIG. 4B.

6. Transitioning Early to AP Mode

According to another technique for maximizing efficiency while operating in dual-mode, wireless device 140 switches operation from STA 140B to AP 140A before expiry of a current operating interval (in the normal course) of STA 140B on receipt of a beacon with a TIM bit indicating that no data is buffered for STA 140B in AP 190. Thus, wireless device 140 switches to operating as AP 140A before the (next) normal scheduled start of an operating interval of AP 140A, as illustrated in FIG. 6.

Figure 6:
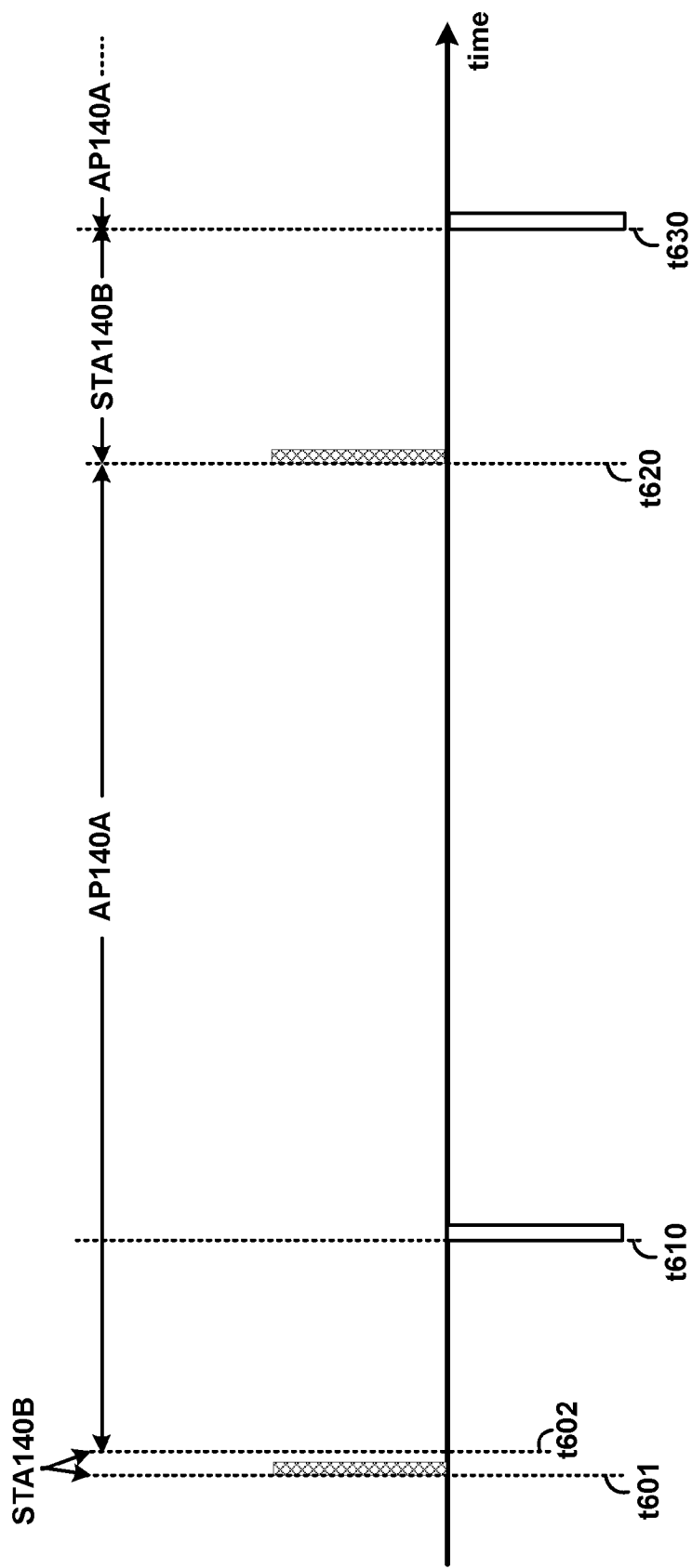
FIG. 6 is a timing diagram illustrating the manner in which a dual-mode wireless device switches operation from a wireless station to an AP, in an embodiment of the present disclosure.

In FIG. 6, t601 represents the start of an operating interval of STA 140B. At t601, STA 140B receives a beacon from AP 190, with the TIM bit corresponding to STA 140B indicating that there is no data buffered for STA 140B. In response, wireless device 140 switches to operation as AP 140A shortly after t602, and continues to operate as AP 140A till t620. The interval from t610 to t620 represents a normal scheduled operating interval of AP 610. Wireless device 140 switches to operation again as STA 140B at t620, which represents the start of the next (normal) operating interval (t620-t630) of STA 140B. AP 140A is shown as transmitting beacons at t610 and t630. Optionally, although not noted in FIG. 6, STA 140B may issue a NULL frame with the power-management bit set to one to indicate to AP 190 that STA 140B is entering a power-down state. Additionally, when in the power-down state, at least some hardware portions (other than the MAC, baseband and RF portions, or in general portions that are shared with AP 140A) of STA 140B may be powered down. On the next transition to active state, STA 140B may transmit a NULL frame with power-management bit set to zero.

Due to the technique described above, the operating duration of AP 140A is extended (to the extent of duration t602-t610), and the longer availability of AP 140A may translate to higher data throughput to/from AP 140A. AP 140A can now transmit and receive data in the duration from t602 to t610 in addition to the normal available interval t610-t620. Further, having the additional duration t602-t610 provides AP 140A with more time for processing data also. Further, any data transmitted to AP 140A in interval t602-t610 that might otherwise have been lost can now be received by AP 140A. Thus, data loss is also minimized.

Although, wireless device 140 is shown in FIG. 6 as switching to operation as STA 140B at t620, in general, when (i.e., at what instant) such switching occurs may be controlled by the 'listen interval' of STA 140B and/or the DTIM (Delivery Traffic Indication Message) interval of AP 190. As is well known in the relevant arts, a wireless station's listen interval is a multiple of the beacon interval of the AP that the wireless station is associated with. Once the wireless station enters power-down state, the wireless station powers-up only at the end of the listen interval. The details of FIG. 6 assume that STA 140B's listen interval is one (i.e., one beacon period of AP 190).

When STA 140B's listen interval is greater than one, then rather than switching to operation as STA 140B at t620, wireless device 140 switches to operating as STA 140B only after the expiry of the corresponding duration represented by the listen interval. In such instances, wireless device 140A operates uninterrupted as AP 140A for a correspondingly longer duration before switching to operation as STA 140B. For example, if the listen interval of STA 140B is 3, then wireless device 140 would switch back to operating as STA 140B only after expiry of 3 beacon intervals as measured from t601, otherwise operating as AP 140A.

A DTIM interval, on the other hand, is defined by the AP, and is the (1/frequency) with which the AP indicates to STAs of the presence of buffered multicast or broadcast data for the corresponding STAs. An AP indicates the presence of buffered broadcast or multicast data via a DTIM in a beacon once every DTIM interval. Wireless device 140 may be designed to switch to operating again as STA 140B after a desired number of DTIM intervals. Typically, the listen interval ranges from 1 to 2^16 (2 to the power 16) beacon intervals of AP 190, whereas DTIM interval ranges from 1 to 255 beacon intervals. In an embodiment, listen interval of STA 140B is 10, and DTIM interval of AP 190 is 3.

7. Indicating Transition to Power-Down State Immediately after Association

Figure 7:
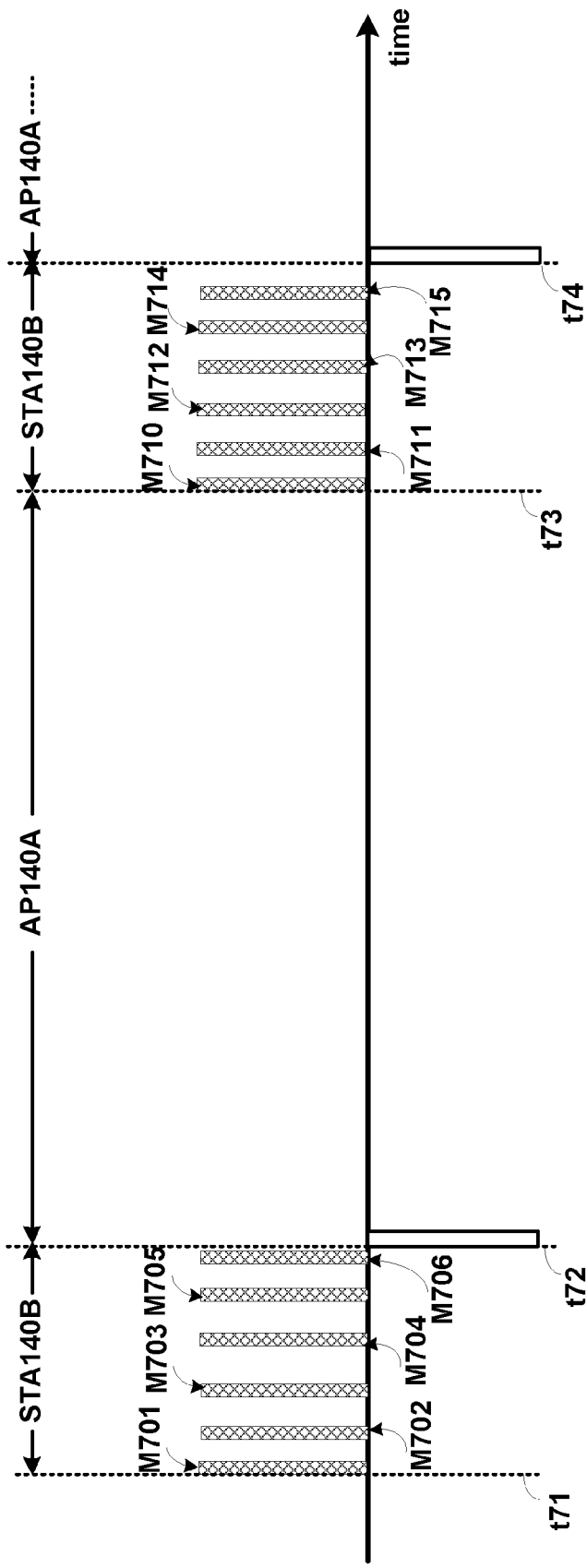
FIG. 7 is a timing diagram illustrating the manner in which a wireless station of a dual-mode wireless device defers exchange of frames used to obtain security keys, in an embodiment of the present disclosure.

According to another technique for maximizing efficiency while operating in dual-mode, STA 140B indicates, immediately after association, to AP 190 that STA 140B is about to enter a power-down state, as illustrated with respect to FIG. 7. It is assumed that STA 140B and AP 190 employ either WPA (Wi-Fi protected Access) or WPA2 (Wi-Fi Protected Access II) security for communications with each other.

In FIG. 7, the interval t71-t72 represents the first operating interval of STA 140B after wireless device 140 powers-up and initialization is complete. STA 140B receives a beacon (indicated by marker M701) transmitted by AP 190 at t71. Next, STA 140B transmits an authentication request frame M702, AP 190 responds by transmitting an authentication response frame M703. The authentication request and authentication response frames are according to Open System authentication of IEEE 802.11. Subsequently, STA 140B transmits an association request frame M704. In response, AP 190 transmits an association response frame M705.

Immediately after receipt (and processing) of the association response frame M705, STA 140B transmits a NULL frame with power management (PM) bit equal to 1, thereby signaling to AP 190 that STA 140B is entering a power-down state. STA 140B wakes-up from power-down state at t73 and receives a next beacon M710 from AP 190. The TIM bit corresponding to STA 140B in beacon M710 indicates that data is buffered for STA 140B in AP 190. Here, the buffered data corresponds to the first of four frames (according to a security protocol (WPA or WPA2)) awaiting delivery to STA 140B. Accordingly, STA 140B issues a request/message (M711) for the first of the four frames. Thus, according to the technique, AP 190 desists from commencing procedures for generation of security keys for use in data-exchange between STA 140B and AP 190 till STA 140B transmits a request (in a next operating interval) to AP 190 to commence the procedures.

As is well-known, when the WPA2 procedure is used (WPA2 uses Advanced Encryption Standard or AES encryption), a 4-way handshake occurs between an AP and the associated wireless station to generate both the pairwise transient key (PTK, used for encryption/decryption of unicast frames) as well as the group key (Group Temporal Key, for encryption/decryption of multicast and broadcast frames. The 4-way handshake of WPA2 is described in detail in the IEEE 802.11i-2004 standard. Referring to FIG. 7, M712, M713, M714 and M715 represent the four frames of the WPA2 protocol. Frames M712 and M714 are transmitted by AP 190, while M713 and M715 are transmitted by STA 140B. At the end of the 4-way handshake, each of STA 140b and AP 190 has the PTK and GTK security keys.

When the WPA procedure is used (WPA uses Temporal Key Integrity Protocol or TKIP encryption), a 4-way handshake (not shown) occurs between AP 190 and STA 140B to generate the PTK, followed by a 2-way handshake (also not shown) between AP 190 and STA 140B to generate the GTK.

The transmission of the NULL frame M706 causes AP 190 to suspend transmission of the first frame of the 4-way handshake till requested by STA 140B (via frame M711), and therefore prevents any potential loss of such frame due to wireless device 140 switching to operating at AP 140A at t72. In general, the 20 ms operating interval of STA 140B may not guarantee completion of exchange of the frames according to WPA or WPA2 (in addition to the authentication and association frames and beacon) within one operating interval of STA 140B, thereby potentially requiring STA 140B to retry obtaining of the security keys repeatedly. The technique illustrated with respect to FIG. 7 splits the process across two operating intervals of STA 140B and may thereby ensure successful completion.

The block-level implementation details of wireless device 140 in an embodiment are described next.

8. Wireless Device

Figure 8:
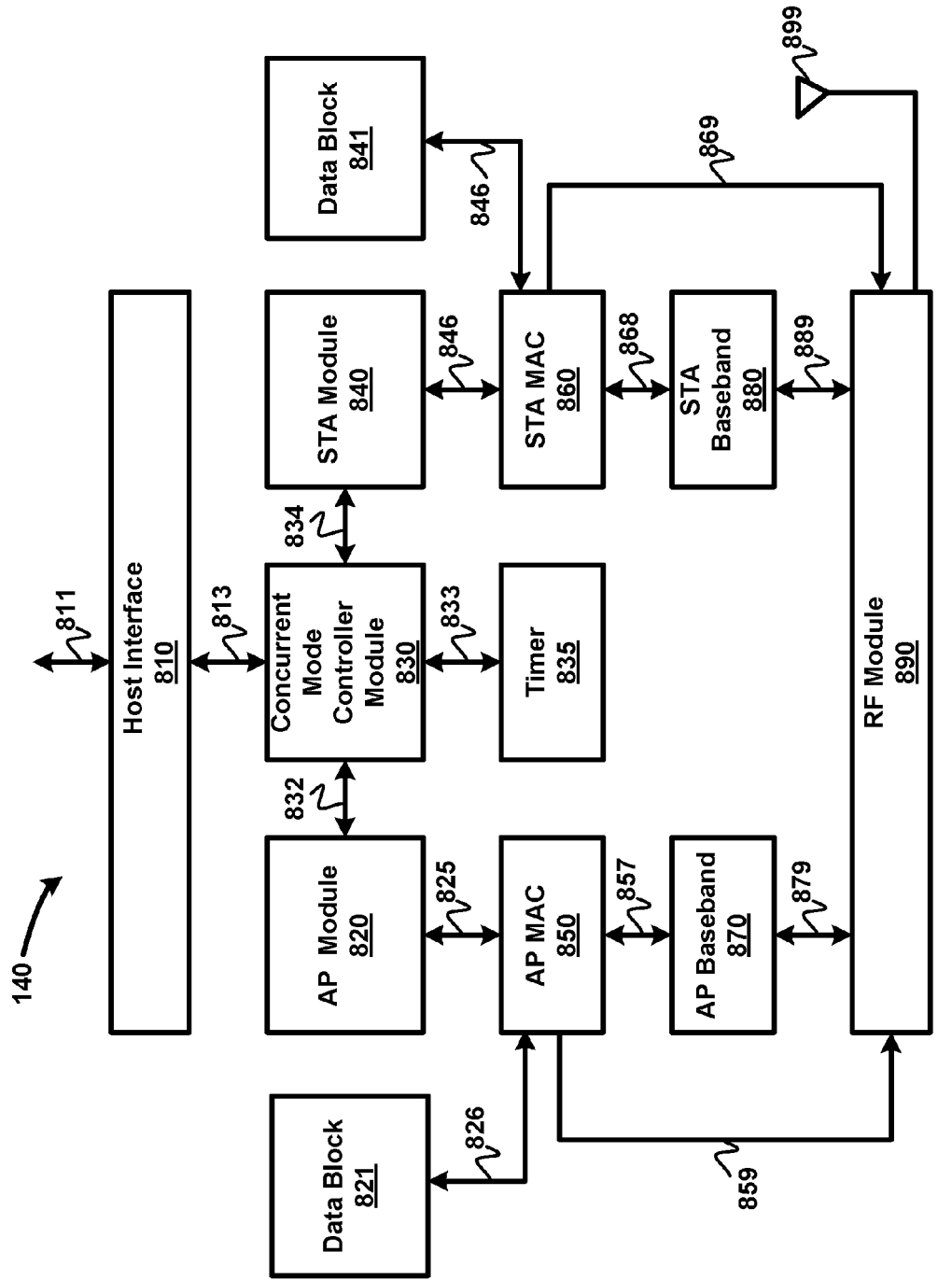
FIG. 8 is a block diagram illustrating the details of a wireless device, in an embodiment of the present disclosure.

FIG. 8 is a diagram illustrating block-level implementation details of a wireless device, in an embodiment of the present disclosure. Wireless device 140 is shown containing host interface 810, AP module 820, AP MAC 850, AP baseband 870, STA module 840, STA MAC 860, STA baseband 880, RF module 890, antenna 899, concurrent mode controller module 830, timer 835, data block 821 and data block 841. The combination of modules 820, 850 and 870 is termed herein as "AP chain". The combination of modules 840, 860 and 880 is termed herein as "STA chain". It is noted here that while separate MAC and baseband units for AP 140A and STA 140B are shown in FIG. 8, in other embodiments, the MAC and baseband layers may be a single block that is operated for AP 140A and STA 140B in a time-division multiplexed manner, thereby providing significant cost and power savings.

When wireless device 140 operates as AP 140A, data block 821 receives, from AP MAC 850 (on path 826), data packets transmitted to AP 140A from a WLAN station (e.g., one of stations 120A-120C). Data block 821 determines the target address to which the data packets are destined, and forwards the data packets with the corresponding address (of the other corresponding one of stations 120A-120C or some other device in wired network 150) back to AP MAC 850 (on path 826). When operating as AP 140A, data block 821 also generates/forms the data (or message bits) representing WLAN beacons transmitted by AP chain.

Data block 841 generates data (or message bits) to be transmitted by STA 140B, as well as the address of the destination node for the data, and forwards the data and address to STA MAC 860 (on path 846). In addition, data block 841 receives, from STA MAC 860 (on path 846), data packets received from AP 190. Data block 841 processes the received data appropriately.

AP module 820 computes the parameters to be used when wireless device 140 transmits or receives signals as AP 140A. AP module 820 provides the value of the parameters to AP MAC 850 on path 825. The specific values of the parameters may be fixed, or be variable/configurable based on user inputs (provided via host interface 810). The parameters may include the WLAN beacon interval to be used by AP 140A, the length of power-ON durations (i.e., width of operating intervals) of AP 140A, etc. Other parameters may include the security keys to be used for encryption and decryption of data sent to or received from external devices, BSSID (Basic Service Set Identifier), etc. In an embodiment, AP module 820 is implemented as corresponding software instructions executed by one or more processors.

AP MAC 850 performs medium access control operations to enable transmission and reception of data from/to AP 140A. AP MAC 850 forms data frames (the data may be obtained in the manner described above with respect to block 821) and other frames (e.g., management frames) according to WLAN standards, and conforming to the parameters received from AP module 820. In an embodiment, AP MAC 850 is implemented using a combination of software instructions and hardware blocks (primarily registers and queues). The software instructions form the data/management frames noted above, and store the frames in corresponding hardware queues contained in AP MAC 850. The software portion of AP MAC 850 also program the corresponding registers to effect channel access control mechanisms according to IEEE 802.11. On obtaining access to the WLAN channel (which is a wireless medium), AP MAC 850 forwards the corresponding frame(s) to AP baseband 870 on path 857. AP MAC 850 may operate correspondingly to process data received, via AP baseband 870, on the WLAN channel from external devices/systems, and forward the data to block 821, and the description is not provided in detail in the interest of conciseness.

AP baseband 870 receives the data bits (or symbols) of frames from AP MAC 850, and modulates a carrier signal with the data bits/symbols. The modulated carrier signal represents a baseband signal according to IEEE 802.11 standard, and AP baseband 870 forwards the baseband signal to RF module 890. When receiving data from external systems, AP baseband 870 extracts data bits/symbols from a modulated carrier received via RF module 890, and forwards the data bits/symbols to AP MAC 850 for further processing.

STA module 840 computes the parameters to be used when wireless device 140 operates as STA 140B. The parameters include the length of operating interval of STA 140B.

STA MAC 860 performs medium access control operations to enable transmission and reception of data from/to STA 140B. In an embodiment, STA MAC 860 is implemented using a combination of software instructions and hardware blocks (primarily registers and queues). The software instructions program the corresponding registers to effect channel access control mechanisms according to WLAN IEEE 802.11. On obtaining access to the WLAN channel, STA MAC 860 forwards the data received from data block 841 to STA baseband 880 on path 868. STA MAC 860 may operate correspondingly to process data received, via STA baseband 880, on the WLAN channel from external devices/systems, and forwards the data to data block 841, and the corresponding description is not provided in the interest of conciseness.

STA baseband 880 receives data bits (or symbols) from STA MAC 860, and modulates a carrier signal with the data bits/symbols. STA baseband 880 forwards the baseband signal to RF module 890. When receiving data bits/symbols, STA baseband 880 extracts the data bits/symbols from a modulated carrier received via RF module 890, and forwards the data bits/symbols to STA MAC 860 for further processing.

RF module 890 is shared by the blocks corresponding to AP 140A and STA 140B in a time-multiplexed manner Though not shown, RF module 890 contains frequency up-converters and frequency down-converters. The up-converters translate the carrier frequency of the baseband signal to a higher frequency as specified by the corresponding specification (e.g., WLAN). The up-converted signal is transmitted to a wireless medium via antenna 899. The down-converters receive a WLAN signal via antenna 899, and translate the signal to the corresponding lower (baseband) frequency, and provide the baseband signal on the corresponding one of paths 879 and 889. The specific up-converted frequency (i.e., transmit and receive frequency at antenna 899) may be selected from one of the bands allocated for WLAN, namely the 2.4 Giga Hertz (GHz), 3.6 GHZ, 5 GHz and 60 GHz frequency bands. The up-converters noted above may be implemented using local oscillators, mixers, low-pass filters and power amplifiers, as is well known in the relevant arts. The down-converters noted above may be implemented include low-noise amplifiers, local oscillators, mixers, and low-pass filters, as is also known in the relevant arts.

Timer 835 represents one or more hardware timers, which is/are programmable to generate one or more interrupts (on path 833) on, for example, expiry of corresponding count values written to it/them.

Concurrent mode controller module 830 schedules the AP chain and STA chain to operate in a time-multiplexed manner (in non-overlapping intervals, as described above) to enable wireless device 140 to operate both as STA 140B and AP 140A, as described in detail above. Concurrent mode controller module 830 may program timer 835 with corresponding count values to generate interrupts (e.g., at 20 ms and 100 ms), based on which switching of operation of wireless device 140 as a STA 140B and AP 140A occurs.

Thus, with respect to FIG. 3A for example, concurrent mode controller module 830 may program timer 835 to generate an interrupt at t301. In response, concurrent mode controller module 830 either restores the data structures and register values representing the previously saved context of STA chain or initializes the context (if commencing operation after a power ON of wireless device 140). Concurrent mode controller module 830 programs timer 835 to generate an interrupt at t310, and wireless device 140 operates as AP 140A till t320.

At t320, timer 835 generates an interrupt (as earlier programmed). In response, concurrent mode controller module 830 suspends the operation of AP chain (for example by writing into corresponding registers in AP MAC 850), and saves/store the context of the AP chain (data structures, register values, etc.) for later restoration. Following the context store of the AP chain, concurrent mode controller module 830 either restores the data structures and register values representing the previously saved context (data structures, register values, etc.) of STA chain or initializes the context (if commencing operation after a power ON of wireless device 140).

Host interface 810 provides electrical and protocol interfaces to enable local connection of wireless device 140 with an external device/system. The external system could, for example, be a computer. A user may provide configuration information to wireless device 140 via the computer. The configuration information may include the parameters noted above with respect to AP module 820 and STA module 840. In operating as STA 140B, the specific AP (e.g., AP 190) with which station 140 is to associate may also be specified by a user via the computer or external device/system in general.

It should be further appreciated that a wireless device can be enabled with the features described above as a desired combination of one or more of hardware, executable modules, and firmware. The description is continued with respect to an alternative view of the details of FIG. 8.

9. Digital Processing System

Figure 9:
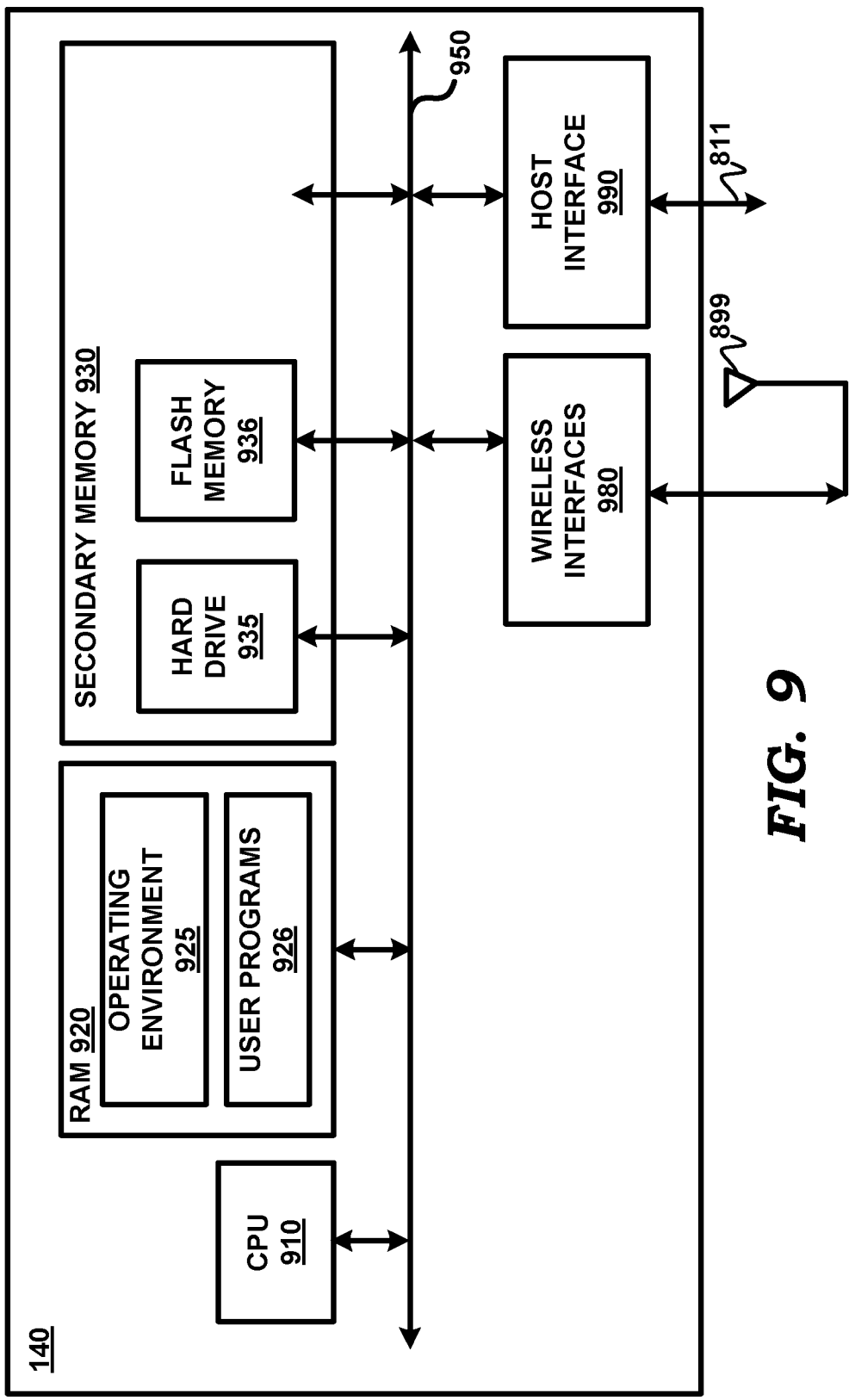
FIG. 9 is a block diagram illustrating the details of a wireless device in an alternative view, in an embodiment of the present disclosure.

FIG. 9 is a block diagram illustrating the details of wireless device 140 in an alternative view. Wireless device 140 may contain one or more processors such as a central processing unit (CPU) 910, random access memory (RAM) 920, secondary memory 930, wireless interfaces 980 and host interface 990. All the components may communicate with each other over communication path 950, which may contain several buses as is well known in the relevant arts.

CPU 910 may execute instructions stored in RAM 920 to provide several features of the present disclosure. CPU 910 may contain multiple processing units, with each processing unit potentially being designed for a specific task. Such one or more processors may be together referred to as a processor block. Alternatively, CPU 910 may contain only a single general-purpose processing unit.

RAM 920 may receive instructions from secondary memory 930 (non-transitory/non-volatile machine readable medium) via communication path 950. RAM 920 is shown currently containing software instructions constituting operating environment 925 and/or other code/programs 926. In addition to operating system 925, RAM 920 may contain other software programs such as device drivers, etc., which provide a (common) run time environment for execution of code/programs/applications (in the form of execution entities).

Secondary memory 930 is shown containing hard drive 935 and flash memory 936. Secondary memory 930 stores data and software instructions (code), which enable wireless device 140 to provide several features in accordance with the present disclosure. Thus, secondary memory 930 may store software instructions representing modules 820, 821, 830, 840, 841 and the corresponding software portions of modules 850 and 860 of FIG. 8. The software instructions (and additionally configuration data) may either be copied to RAM 920 prior to execution by CPU 910, or may be executed directly from flash memory 936.

Host interface 990 corresponds to host interface 810 of FIG. 6. Wireless interface 980 represents the combination of modules 870, 880, 890 and the hardware portions of modules 850 and 860.

CPU 910 executes instructions stored in RAM 920 to enable efficient operation of a dual-mode wireless device as a STA and AP, as described in detail above.

10. Conclusion

References throughout this specification to "one embodiment", "an embodiment", or similar language means that a particular feature, structure, or characteristic described in connection with the embodiment is included in at least one embodiment of the present invention. Thus, appearances of the phrases "in one embodiment", "in an embodiment" and similar language throughout this specification may, but do not necessarily, all refer to the same embodiment.

While various embodiments of the present invention have been described above, it should be understood that they have been presented by way of example only, and not limitation. Thus, the breadth and scope of the present invention should not be limited by any of the above-described embodiments, but should be defined only in accordance with the following claims and their equivalents.

What is claimed is:

1. A method of operating a wireless device, said method comprising:
   operating as a wireless station (STA) associated with a first access point (AP) of a first basic service set (BSS) in a first set of intervals, and as a second AP of a second (BSS) in a second set of intervals;
   receiving, in a first interval of said first set of intervals, an indication that data is buffered in said first AP for said STA;
   determining whether said indication is received later than a pre-determined duration from start of said first interval; and
   issuing, in a second interval of said first set of intervals, a request to said first AP for at least some portion of said buffered data, wherein if said indication is received later than said pre-determined duration from start of said first interval, said request is issued as an initial response to said receiving of said indication in said second interval,
   wherein said second interval is later than said first interval and separated from said first interval by a third interval, wherein said wireless device operates as said second AP in said third interval, wherein intervals in said first set of intervals alternate with corresponding intervals in said second set of intervals, wherein none of said first set of intervals overlaps with any of said second set of intervals, wherein said wireless device operates in a dual-mode based on time division multiplexing, wherein a bit in a Traffic Indication Map (TIM) of a beacon is received at a time instant in an interval of the first set of intervals earlier than said pre-determined duration from start of said first interval.

2. The method of claim 1, wherein said indication is a bit in a Traffic Indication Map (TIM) of a beacon transmitted by said first AP.

3. The method of claim 1 comprising:
   issuing an initial request for said data and receiving a first portion of said data in response, wherein said first portion is received as a first frame, said first frame indicating that at least one more portion of said data is yet to be transmitted from said first AP to said STA,
   wherein said request being for said at least one more portion such that said at least one more portion comprises said at least some portion.

4. The method of claim 3, wherein said indication is a "more data" bit in said first frame.

5. The method of claim 3, wherein the end time instant of said pre-determined portion comprises more than a second duration from the end of said first interval, wherein said second duration equals a duration normally required for requesting a data frame from said first AP and to receive said data frame.

6. The method of claim 1, wherein said issuing issues said request to said first AP prior to reception, in said second interval, of a second beacon from said first AP.

7. The method of claim 1, wherein the boundaries of said first set of intervals and said second set of intervals are set according to an approach, wherein said approach is based on expected arrival times of beacons from said first AP and desired transmission times of beacons from said second AP in a normal mode of operation, said method further comprising:
   receiving, at a second time instance in a fourth interval of said first set of intervals, a second TIM indicating that no data is buffered in said first AP for said STA; and
   switching operation of said wireless device as said second AP after said second time instant and ahead of the boundary determined based on said approach such that said wireless device thereafter operates continuously as said AP up to the end of a fifth interval of said second set of intervals determined according to said approach.

8. The method of claim 1, further comprising:
   transmitting successively to said first AP, in a sixth interval of said first set of intervals, an authentication request frame and an association request frame;
   receiving, in said sixth interval, an authentication response frame and an association response frame from said first AP as respective responses to said authentication request and said association request; and
   transmitting to said first AP, in said sixth interval, a message indicating that said STA will be transitioning to a power-save state, wherein transmission of said message is after reception of said association response,
   wherein, said first AP desists from commencing procedures for generation of security keys for use in data-exchange between said STA and said first AP till said STA transmits another message to said first AP to commence said procedures.

9. The method of claim 7, further comprising:
   transmitting another message to said first AP in a seventh interval of said first set of intervals, said another message indicating that said STA is prepared to resume normal operation, wherein said first AP initiates a security protocol to send frames for generation of security keys upon receiving said another message; and
   receiving said frames and generating said security keys.

10. A non-transitory machine readable medium storing one or more sequences of instructions for operating a wireless device of a wireless network, wherein execution of said one or more instructions by one or more processors contained in said wireless device enables said wireless device to perform the actions of:

operating as a wireless station (STA) associated with a first access point (AP) of a first basic service set (BSS) in a first set of intervals, and as a second AP of a second (BSS) in a second set of intervals, wherein intervals in said first set of intervals alternate with corresponding intervals in said second set of intervals, wherein none of said first set of intervals overlaps with any of said second set of intervals such that said wireless device operates in a dual-mode based on time division multiplexing, wherein the boundaries of said first set of intervals and said second set of intervals are initially set according to an approach based on expected arrival times of beacons from said first AP and desired transmission times of beacons from said second AP in a normal mode of operation;

receiving, at a first time instance in a first interval of said first set of intervals, a Traffic Indication Map (TIM) indicating that no data is buffered in said first AP for said STA; and switching operation of said wireless device as said second AP after said first time instant and ahead of the boundary determined based on said approach such that said wireless device thereafter operates continuously as said AP up to the end of a second interval of said second set of intervals determined according to said approach.

11. The non-transitory machine readable medium of claim 10, further comprising instructions for causing said wireless device to perform the actions of:

transmitting successively to said first AP, in a third interval of said first set of intervals, an authentication request frame and an association request frame;

receiving, in said third interval, an authentication response frame and an association response frame from said first AP as respective responses to said authentication request and said association request; and transmitting to said first AP, in said third interval, a message indicating that said STA will be transitioning to a power-save state, wherein transmission of said message is after reception of said association response, wherein, said first AP desists from commencing procedures for generation of security keys for use in data-exchange between said STA and said first AP till said STA transmits another message to said first AP to commence said procedures.

12. The non-transitory machine readable medium of claim 11, further comprising instructions for causing said wireless device to perform the actions of:

transmitting another message to said first AP in a fourth interval of said first set of intervals, said another message indicating that said STA is prepared to resume normal operation, wherein said first AP, in response to reception of said another message, initiates a security protocol to send frames for generation of security keys upon receiving said another message; and receiving said frames and generating said security keys.

13. The non-transitory machine readable medium of claim 10, further comprising instructions for causing said wireless device to perform the actions of:

receiving, in a fifth interval of said first set of intervals, an indication that data is buffered in said first AP for said STA; and issuing, in a sixth interval of said first set of intervals, a request to said first AP for at least some portion of said buffered data, wherein said sixth interval is later than said fifth interval and separated from said fifth interval by a seventh interval, wherein said wireless device operates as said second AP in said seventh interval.

14. The non-transitory machine readable medium of claim 13, wherein said issuing issues said request to said first AP prior to reception, in said sixth interval, of a beacon from said first AP.

15. A wireless device of a wireless network, said wireless device comprising:

a processor block and a memory, said memory to store instructions which when retrieved and executed by said processor block causes said wireless device to perform the actions of:

operating as a wireless station (STA) associated with said first AP in a first set of intervals, as a second AP of a second BSS in a second set of intervals and in a third interval, wherein said second interval is later than said first interval and separated from said first interval by said third interval, wherein said wireless device operates as said STA to transmit successively to a first AP of a first basic service set (BSS), an authentication request frame and an association request frame;

receiving, in the first interval of said first set of intervals, an authentication response frame and an association response frame from said first AP as respective responses to said authentication request and said association request;

transmitting, in the first interval of said first set of intervals, to said first AP a message indicating that said STA will be transitioning to a power-save state, wherein transmission of said message is after reception of said association response, wherein said first AP desists from commencing procedures for generation of security keys for use in data-exchange between said STA and said first AP till said STA transmits another message to said first AP to commence said procedures; and transmitting another message to said first AP in a second interval of said first set of intervals, said another message indicating that said STA is prepared to resume normal operation, wherein said first AP initiates a security protocol to send frames for generation of security keys upon receiving said another message; and receiving said frames and generating said security keys.

16. The wireless device of claim 15, wherein intervals in said first set of intervals alternate with corresponding intervals in said second set of intervals, wherein none of said first set of intervals overlaps with any of said second set of intervals such that said wireless device operates in a dual-mode based on time division multiplexing, wherein the boundaries of said first set of intervals and said second set of intervals are set according to an approach based on expected arrival times of beacons from said first AP and desired transmission times of beacons from said second AP in a normal mode of operation, said wireless device further performing the actions of:

receiving, at a first time instance in a fourth interval of said first set of intervals, a Traffic Indication Map (TIM) indicating that no data is buffered in said first AP for said STA; and switching operation of said wireless device as said second AP after said first time instant and ahead of the boundary determined based on said approach such that said wireless device thereafter operates continuously as said AP up to the end of a fifth interval of said second set of intervals determined according to said approach.

17. The wireless device of claim 15, wherein said wireless device further performs the actions of:

receiving, in a sixth interval of said first set of intervals, an indication that data is buffered in said first AP for said STA; and issuing, in a seventh interval of said first set of intervals, a request to said first AP for at least some portion of said buffered data, wherein said seventh interval is later than said sixth interval and separated from said sixth interval by an eights interval, wherein said wireless device operates as said second AP in said eighth interval.

* * * * *